United States Patent [19]
Haxton

[11] Patent Number: 5,933,098
[45] Date of Patent: Aug. 3, 1999

[54] AIRCRAFT SECURITY SYSTEM AND METHOD

[76] Inventor: Phil Haxton, 238 Robbie La., Marietta, Ga. 30060

[21] Appl. No.: 08/821,846

[22] Filed: Mar. 21, 1997

[51] Int. Cl.⁶ .................................................. G08B 21/00
[52] U.S. Cl. ........................ 340/945; 340/430; 340/539; 340/357
[58] Field of Search ..................... 340/945, 573, 340/538, 430, 539, 825.49; 342/357

[56] References Cited

U.S. PATENT DOCUMENTS

| | | | |
|---|---|---|---|
| 3,688,256 | 8/1972 | D'Ausilio et al. | 340/430 |
| 3,703,714 | 11/1972 | Andrews | 340/224 |
| 4,692,742 | 9/1987 | Raizen et al. | 340/539 |
| 4,733,215 | 3/1988 | Memmola | 340/64 |
| 4,737,771 | 4/1988 | Coash | 340/539 |
| 5,049,867 | 9/1991 | Stouffer | 340/426 |
| 5,070,320 | 12/1991 | Ramono | 340/539 |
| 5,103,221 | 4/1992 | Memmola | 340/825 |
| 5,159,344 | 10/1992 | Robinson et al. | 340/945 |
| 5,319,698 | 6/1994 | Glidewell et al. | 340/539 |
| 5,416,468 | 5/1995 | Baumann | 340/539 |
| 5,418,537 | 5/1995 | Bird | 342/357 |

*Primary Examiner*—Jeffery A. Hofsass
*Assistant Examiner*—John Tweel, Jr.
*Attorney, Agent, or Firm*—Isaf, Vaughan & Kerr

[57] ABSTRACT

An airport security system for monitoring and securing airplanes stowed at various site airports within a security network is provided. Each of the planes is fitted with a transmitter or transmitters that transmit coded signals upon detecting an intrusion. In addition, the transmitters transmit periodic check-in signals. The signals are received by a receiver at the site airport, which conveys the coded signals to a local site main computer that, in turn, is connected to a central facility computer coupled to all of the site main computers within the network. If an alarm condition occurs or if an aircraft in the system fails to check-in at its designated time, appropriate alarms are generated and appropriate action taken. Aircraft can also be tracked by the central facility computer as they fly from one site airport to another within the network.

23 Claims, 4 Drawing Sheets

AIRCRAFT SECURITY SYSTEM AND METHOD

TECHNICAL FIELD

This invention relates generally to security systems and more particularly to security systems for monitoring and securing aircraft against vandalism and theft.

BACKGROUND OF THE INVENTION

For many years, vandalism and theft of all types of vehicles has been a major problem for the owners of such vehicles. Theft of automobiles, for example, is a dilemma throughout the world. However, vandalism and theft of small aircraft that are kept at hundreds of small airports throughout the country is an especially acute and progressively more prevalent phenomenon. There are several reasons for the rise in aircraft theft over the years. Not the least of these reasons is the pronounced increase in drug trafficking wherein small airplanes are commonly stolen to transport drugs to and from the country, whereupon the plane is simply ditched or discarded. In addition, many small airports throughout the country are substantially unattended for long periods of time and particularly at night. This makes it relatively easy for an airplane thief to overcome the simple locks provided on airplane doors and steal the airplane and all its equipment. Even when small airports are attended, it is often difficult for the attendant to monitor the comings and goings of the aircraft to insure that only their owners or authorized pilots are using the planes. Thus, in some cases, small airplanes are stolen in broad daylight with the airport attendant being none the wiser. Since even the simplest small aircraft can cost several times the price of an expensive automobile, such theft leads to increased insurance rates and substantial losses for the airplane owners.

In addition to airplane theft, the theft of expensive radio and telemetry equipment aboard small airplanes has also become an acute problem. In these instances, the airplane itself may not be stolen but a thief will break into the cockpit and steal the radio and telemetry equipment, which can itself cost tens of thousands of dollars. Again, this type of equipment theft leads to increased insurance rates and losses.

In the past, there has been virtually no effective security systems for securing aircraft that are parked on the tarmacs of small airports throughout the country. While aircraft can be provided with their own individual security alarm systems similar to those installed in automobiles, these alarm systems can prove to be ineffective, particularly where a small airport is unattended and no one is present to hear an alarm. Accordingly, individual airplane security alarms have proven only marginally successful.

A number of electronic security systems have been developed to protect vehicles and buildings against vandalism. U.S. Pat. No. 3,703,714 of Andrews, for example, discloses a remote alarm system for securing a vehicle such as an automobile. When an unauthorized attempt at access is made to the vehicle, a signal is transmitted to a remote receiver, which generates an alarm signal alerting responsible individuals to the attempted access. U.S. Pat. No. 4,737,771 of Coash teaches a security system for buildings and commercial structures that features a jamming or interference detection methodology. The interference detection methodology functions to detect instances when an unauthorized intruder is jamming the receiver by transmitting prolonged artificial signals thereto. U.S. Pat. No. 5,049,867 of Stouffer discloses a vehicle security system designed to locate an automobile or other vehicle that has been reported stolen. In this system, when a vehicle is reported stolen, a central transmitting station transmits a coded signal that instructs a transceiver within the vehicle to disable the starting circuit of the vehicle and to sound an alarm. Thus, the thief is unable to operate the vehicle once it has been discovered to be missing. U.S. Pat. Nos. 5,070,320 of Ramono and 5,103,221 of Memmola also disclose security systems wherein detectors in a vehicle or building transmit an intrusion code to a central receiver that processes the code.

While these patents and other prior art security systems function acceptably in their intended environments, none of them is suited to the unique demands of securing a large number of aircraft parked on the tarmac of an airport. For example, none of the devices of these patents or of the prior art provide for the constant monitoring of each aircraft to determine that it is still present at the airport. Furthermore, the prior art does not provide a means for tracking and locating a stolen aircraft that has been flown to another airport and landed for fuel or the like. Finally, there are no security systems in the prior art that permit or allow for the linking of a large number of airport sites and the individual aircraft parked at such sites into a regional or nationwide security network for the tracking and security of small aircraft nationwide.

Thus, there is a need for an aircraft security system and methodology that addresses the problems and shortcomings of the prior art and that is particularly tailored and suited for securing and monitoring aircraft parked at and traveling between small airports throughout the country. It is to the provision of such an aircraft security system and methodology that the present invention is primarily directed.

SUMMARY OF THE INVENTION

Briefly described, the present invention, in a preferred embodiment thereof, comprises a security system and methodology for securing small aircraft that are parked at and that travel between airports spread over a designated region. The security system of this invention comprises a set of intrusion sensors/transmitters that are installed on doors, cargo bays, cowlings, and perhaps the instruments of aircraft to be included in the security system. The sensors/transmitters are adapted to transmit a uniquely identified coded signal at periodic intervals and whenever an intrusion is detected. Each aircraft owner is also provided with a personal electronic key transmitter that allows the owner to transmit a signal to arm, disarm, and test the security system of his individual aircraft. He may also transmit a duress signal to the central monitoring station and alert local personnel to respond to his signal for help.

Each airport site in the security network is provided with a site control panel that houses a receiver for receiving coded data signals from the transmitters aboard aircraft stowed at the airport and from key transmitters. A computer based controller comprising a monitoring computer and a main computer is housed in the control panel and is coupled to the receiver. The receiver is adapted to reformat radio signals that it receives from the individual aircraft security transmitters or their users and provide the information encoded in the signals to the monitoring computer. The monitoring computer then formats the data and delivers it to the main computer for appropriate action.

The main computer within the control panel at each airport site maintains a status database of all aircraft normally stowed at the site as their home base. The main computer uses the data in this database to make decisions and take actions based upon the nature of the signals received from the monitoring computer. Further, each of the site main computers is linked via dedicated telephone lines to a central facility computer that can access the site main computers at a large number of local airports for managing an entire regional or national security network.

In one mode of operation of the present invention, the security sensors/transmitters within each aircraft at a site airport transmit a status signal at predetermined time intervals such as, for example, randomly every ninety minutes. The main computer in the control panel at the airport continually interrogates the status database maintained therein and notes for each aircraft in the database the time of the last status signal check-in from that subscriber's aircraft. If the aircraft transmitter fails to transmit a status signal within the predetermined time interval, then the aircraft associated with that transmitter is considered as being overdue for check-in. The main computer can then alert an operator to check for the presence of the aircraft on the tarmac to insure that it has not been moved or stolen since the last check-in time. Therefore, in this mode, all the aircraft at a particular airport are monitored continuously and an alarm condition is generated whenever one of the aircraft fails to check-in within its prescribed time. A theft or disappearance to an aircraft can thus be detected quickly.

In another mode of operation, upon receipt of an incoming signal from an aircraft or owner key transmitter, the main computer interrogates the site database to determine that the aircraft associated with the signal is logged into the site database as an aircraft normally stowed there. If not, then it is likely that the aircraft from which the signal originated was recently landed at the airport and had been flown from another airport in the security network. A temporary file is then created in the main computer corresponding to the received signal and this file is made available to the central facility computer. In this way, if an aircraft is reported stolen at any of the site airports, the central facility computer need only poll each of the site main computers within the system to determine where the stolen airplane checked in. Accordingly, a stolen aircraft that is flown to another airport within the network can be located quickly and secured by local authorities.

In still another mode of operation, the site main computer receives a transmission from a user key transmitter with a request that the user's aircraft be armed, disarmed, or placed in the test mode. The site main computer then checks that all of the intrusion sensors on the aircraft indicate that the aircraft is secured, whereupon the requested status is initiated. A short burst on a local siren informs the user that his request has been received and carried out. If the site main computer determines that one of the doors of the aircraft has been opened or that the aircraft is otherwise unsecure, the request to disarm or arm the system or place it in the test mode is denied and an alarm code is generated indicating that an inappropriate condition is present regarding that particular aircraft.

In a still further mode of operation, the site main computer might receive a signal from an aircraft transmitter indicating that one of the doors of the aircraft has been opened or that the security of the aircraft has otherwise been breached. Under these conditions, a theft or vandalism is indicated. The local alarm at the airport is sounded and an alarm message can be provided via telephone line to the central facility computer indicating that an intrusion has occurred. The central facility computer can then alert appropriate security personnel or the police to investigate the condition and thwart the thief before he is able to steal the airplane or its equipment.

Thus, it is an object of this invention to provide an airport security system that addresses the special needs of securing small aircraft at airports throughout the country.

It is another object of the invention to provide an airport security system that continuously monitors aircraft that subscribe to the security system to determine that they are still present and accounted for at all appropriate times.

A further object of the invention is to provide an airport security network that functions in conjunction with airports throughout the country to track the movement of subscribing aircraft and to locate aircraft that have been reported to be stolen.

An additional object of the invention is to provide an aircraft security system wherein signals from the various aircraft are received and processed at a central location on the airport so that all aircraft are monitored as a group.

Another object of the invention is to provide the owners of aircraft and particularly small aircraft with security and peace of mind that their aircraft is being monitored and that the chances of a theft or vandalism are greatly reduced.

These and other objects, features, and advantages of the present invention will become more apparent upon review of the detailed description set forth below when taken in conjunction with the accompanying drawings, which are briefly described as follows.

DETAILED DESCRIPTION OF THE PREFERRED EMBODIMENT

Figure 1:
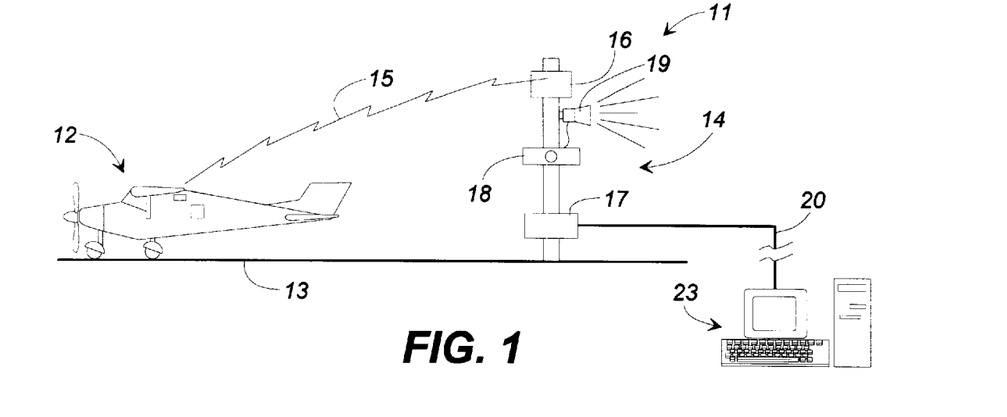
FIG. 1 is a schematic illustration of an airport security system that embodies principles of the present invention in a preferred form.

Referring now in more detail to the drawings, in which like numerals refer to like parts throughout the several views, FIG. 1 illustrates in top level schematic form an airport security system or network that embodies principles of this invention in a preferred form. In the illustrated embodiment, the security system is designed to monitor and secure aircraft 12 that are parked and stowed on the tarmac 13 of a small airport. While only one airplane 12 is illustrated in FIG. 1, it will be understood that the present invention is intended for use with a large number of airplanes that may be parked at various locations at the airport. Further, the aircraft might be housed in a hangar rather than on the tarmac and the present invention encompasses such stowage.

The aircraft 12 is provided with one or more intrusion sensors/transmitters adapted to transmit a uniquely identified coded radio signal 15 upon detection of an intrusion into the aircraft. Such sensors might include, without limitation, sensors that detect the opening and closing of a door on the aircraft, the opening of the cowling on the aircraft, the opening of the baggage compartment on the aircraft, or sensors that detect motion within the cockpit of the aircraft. Sensors might also be provided on some of the expensive radio equipment within the aircraft for detecting removal of the equipment from the equipment bay. Typically, a number of sensors are coupled to a single transmitter, which transmits its coded signal whenever any of the sensors detect an intrusion. Independent sensor/transmitters are also possible, however.

One type of transmitter that works well in the present invention is available from Ademco, a Division of the Pitway Corporation. These transmitters are coupled to the aircraft security sensors and are adapted to transmit a unique identifier and a coded binary status message upon detection of an intrusion of the aircraft. One or all of the bits in the coded binary message can be set to one or zero to indicate the status of a variety of conditions sensed by the sensors. In addition, the Ademco brand transmitter is adapted to initiate a status or check-in transmission at predetermined intervals of time. Such status transmissions are used in the present invention to monitor aircraft on a continuing basis, as described more fully below.

Coded signals 15 transmitted from the security transmitter aboard aircraft parked at an airport are received at a central location on the airport by a receiver 16, which preferably is located in an elevated position on a pole or the like. A preferred receiver for use in the present invention is also available from Ademco and is designed to operate with the transmitters aboard the various aircraft. The Ademco receiver 16 is adapted to receive the uniquely identified coded transmissions 15 from the aircraft transmitters and to queue the coded messages carried by these transmissions in a storage queue for retrieval by other operative elements of the present invention.

The receiver 16 is operatively coupled to a control panel or control unit 17 that includes two dedicated computers for performing the various functions of the present invention as described more fully below. In general, the control unit 17 is adapted to retrieve from the receiver queue the coded signals from the various aircraft security transmitters and make decisions and take actions based upon the content of the signals that are received.

In some instances, when a received coded signal indicates an alarm condition, the control unit 17 might sound an audible alarm through a horn 19 that is powered by an alarm circuit 18. Simultaneously, control unit 17 might initiate action commensurate with the condition indicated by the coded signal. Further, in the preferred embodiment, the control unit 17 is coupled through a telephone line 20 to a central facility computer 23 that may be located virtually anywhere in the country. In the ultimate preferred embodiment, each or at least most small airports in the country would be provided with a site security system of the present invention including the aircraft sensors, receiver, and control unit. Each of the site control units would then be coupled through their dedicated telephone lines to the central facility computer 23, which would function to monitor the entire network and coordinate the various site security systems to perform desirable functions as outlined below. Therefore, while only one aircraft and one site are illustrated in FIG. 1 for clarity, a plurality of sites each housing a plurality of aircraft are envisioned to comprise a nationwide security network through application of the present invention.

Figure 2:
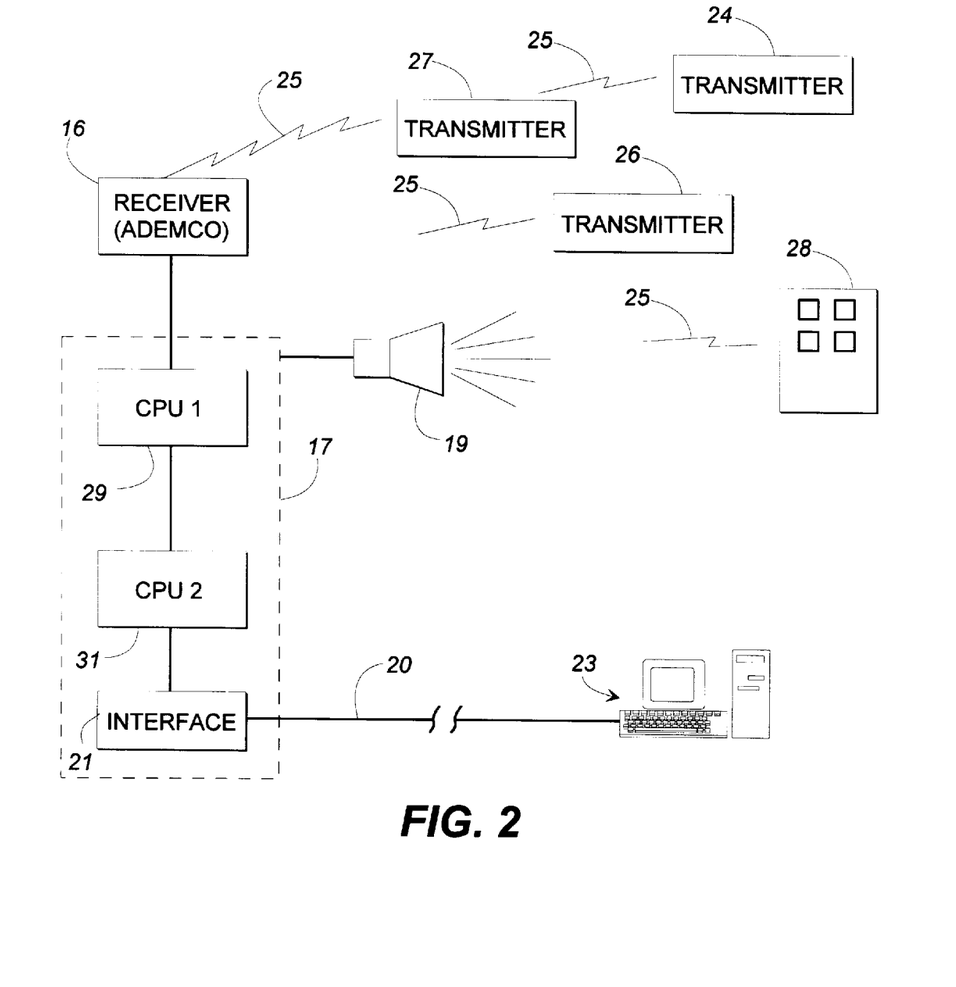
FIG. 2 is a functional element diagram showing the various elements of the security system of this invention.

FIG. 2 is a functional element diagram showing the key elements of the present invention in more detail. Sensors/transmitters 24, 26, and 27 are installed aboard multiple aircraft and each is adapted to detect an intrusion condition such as the opening of a door, the opening of the aircraft cowling, or motion within the cockpit. Upon such detection, the transmitters are adapted to transmit a uniquely identified coded radio signal 25 that can be received by the receiver 16. As mentioned above, each signal 25 is coded with a message consisting of a six digit hexadecimal number that uniquely identifies the transmitter from which the signal originated followed by an eight bit status byte that contains information regarding the current status of the sensors aboard the aircraft. In the preferred embodiment, the eight bit status byte is configured as follows.

Bit 1—security circuit status bit—door open or closed.

Bit 2—transmitter cover status bit—cover secure or removed.

Bit 3—Battery status bit—normal or low battery.

Bit 4—Supervisory status bit—normal check-in signal.

Bit 5—Power up status bit (sent upon battery replacement or upon initial installation of battery).

The remaining bits of the eight bit status byte are reserved in the preferred embodiment but can be set to indicate a variety of other conditions. Thus, each of the transmitters is capable of transmitting a radio frequency coded signal that identifies the transmitter, and thus the airplane associated therewith, and that conveys the current status of the transmitter and monitored conditions aboard the aircraft as encoded into the status byte.

Also included in the preferred embodiment of the present invention is a user key transmitter 28 that can be used by the owner of an aircraft to arm, disarm, and test the security system in his airplane. The user key transmitter 28 is provided with buttons on its face that can be pressed by the aircraft owner to request that the security system in his aircraft be disarmed, armed, or be placed in a test condition. The key transmitter 28 also generates a coded radio signal 25 that identifies the key transmitter and conveys a status byte indicating the action that has been selected by the user by pressing one of the buttons on the face of the key transmitter.

Preferably, the transmitter aboard a single aircraft comprises one security zone and a transmission from the transmitter is indicative of a breach of that zone and thus a breach of the security of the associated aircraft. In this way, the present invention can be used to monitor and secure a large number of aircraft parked at an airport with each aircraft being considered a zone for security system purposes.

Further, as mentioned briefly above, the transmitter aboard the aircraft is adapted to transmit a brief check-in signal at predetermined time intervals such as, for example, every ninety minutes. These intermittent transmissions also include the identifier byte as well as the status byte and are used, as detailed below, to monitor the aircraft on a continuing basis and to detect when an aircraft is moved out of range of the receiver 16.

The receiver 16 is adapted to receive the coded radio signals 25 from the various transmitters and to queue the transmitted signals embedded in the transmissions for access by the functional components within the control panel 17. The control panel 17 houses two dedicated central processing units (CPUs) or computers that work together to carry out the various functions of the present invention. The first computer 29 is a monitoring computer and functions to interrogate the output queue of the receiver 16 continuously to determine when the receiver has received a coded signal from a transmitter and placed the coded signal in its output queue. When the monitoring computer 29 detects that the receiver has received a coded signal, the coded identifier and status byte of the signal is reformatted as appropriate and passed off to the second dedicated computer 31 within the control panel 17, which is the site main computer. The monitoring computer 29 then continues to monitor the receiver's output queue for subsequent messages that might be received and placed in the queue. Thus, the monitoring computer is a continuous monitor that receives, reformats, and hands off coded messages received from the transmitters in the aircraft within the site security system.

The site main computer 31 within the control panel 17 receives coded signals provided by the monitoring computer 29, interprets these signals, and takes actions appropriate to the content of each signal. The particular actions taken by the main computer 31 are described in more detail below. In general, however, these functions include assuring that the transmitters within the aircraft in the security system "check-in" at predetermined time intervals by transmitting their periodic check-in signals. As long as all of the transmitters check-in in this manner, the aircraft are all still present at the airport and have not been removed or moved out of range of the receiver. If a transmitter for a particular aircraft fails to check-in at its designated time, the main computer 31 notifies the central facility computer 23 of this condition and a dispatcher can take appropriate action or notify security personnel as necessary.

Another function of the site main computer 31 is to detect when an incoming signal indicates that a user or aircraft owner has requested through his key transmitter, that his system be armed, disarmed, or placed in a test mode. Upon such a request, the main computer 31 interrogates the status database that is maintained in the main computer's memory to access the last status transmission for that aircraft to assure that all of the intrusion sensors aboard the aircraft indicate a secure condition. The main computer 31 then takes action appropriate to the request made by the aircraft owner.

Finally, the main computer 31 functions to detect a transmission caused by an intrusion into the aircraft or other breach of security such as, for example, tampering with a sensor. An intrusion transmission is identified through the setting of the security circuit status bit in the status byte to a "door open" indicator. The main computer 31 can then sound an alarm on the local siren 19 and notify the central facility computer 23 that an intrusion condition has occurred.

The site main computer 31 is coupled to data storage means that contains a master database of all of the aircraft that are included within the security system at a particular site or airport. This database can be interrogated by the main computer 31 at any time. The database contains a substantial amount of information regarding the identification and location of the monitoring site and also contains information about the aircraft of each subscriber or client that is normally stowed at the site airport as its home base. For example, the database might include each client's name and address, a password, the transmitter ID for the transmitter associated with the particular aircraft, the phone numbers of the owner, and the like. In addition, the client database includes information regarding the last time that the transmitter associated with that aircraft transmitted a signal or checked in at the regularly scheduled time. This information can be accessed by the main computer 31 to determine the most recent status of the aircraft and to determine when a transmitter associated with an airplane has failed to check-in within a prescribed period of time. The site main computer 31 is also used, through an attached keyboard and CRT monitor, to enter and modify the various data stored in the client database as well as to perform other housekeeping and maintenance functions, such as the temporary entry of a visiting aircraft into the data base for monitoring.

In the preferred embodiment, the main computer 31 at each airport within the network is coupled by a telephone line 20 to a central facility computer 23 that monitors each of the airport sites within the security network. Information can be requested from each of the sites by the central facility computer and the central facility computer can be used to manage the logistics of travel of the various aircraft from place to place as described in more detail below.

The various elements of hardware that make up the present invention as well as the interconnections thereof are well understood by those of skill in this art. Accordingly, a detailed description of the electronic circuits and their interconnections is not required for purposes of the present disclosure. As has already been stated, however, the transmitters and receivers are standard electronic parts available from the Ademco Company. Computers 29 and 31 are standard industrial control computers that are available from a variety of sources. Finally, the central facility computer preferably is a standard IBM Class 486 or Pentium computer appropriately programmed to carry out the functions of the present invention in response to signals received from the transmitters.

Figure 3:
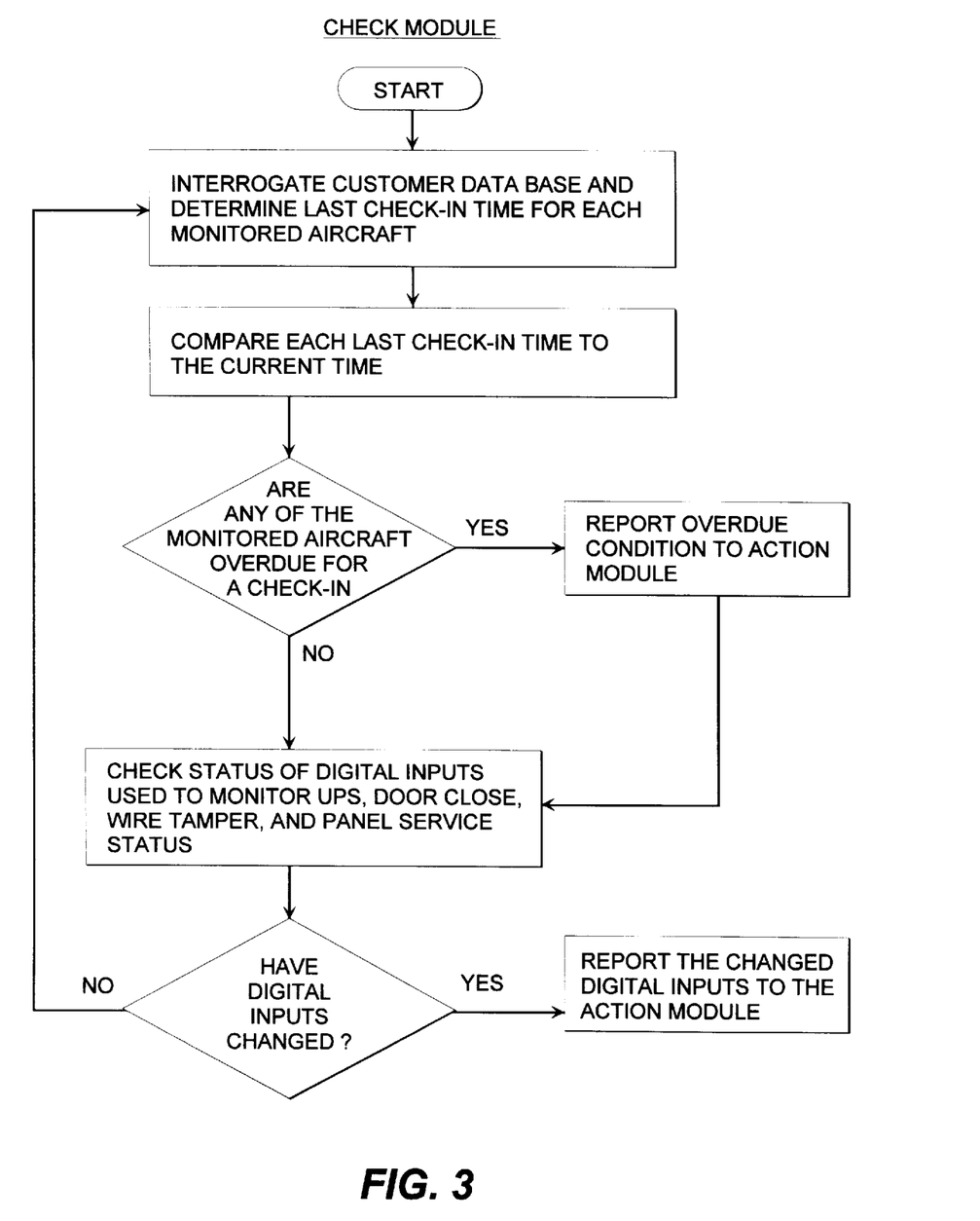
FIG. 3 is a functional flow diagram illustrating a preferred method of implementing the continuous monitoring function of the present invention.
Figure 4A:
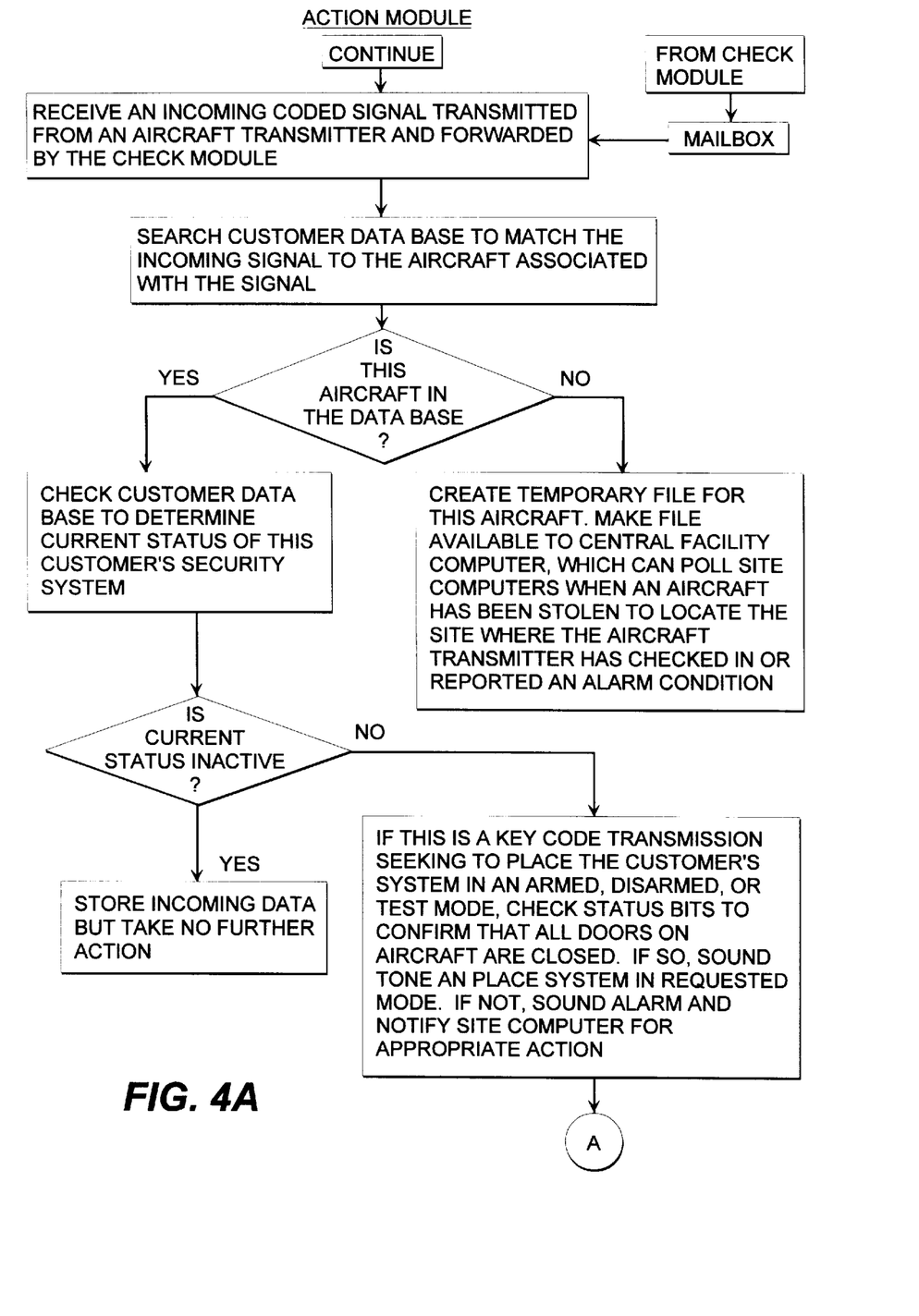
FIGS. 4A and 4B illustrate a functional flow diagram showing other modes of operation of the airport security method of this invention.
Figure 4B:
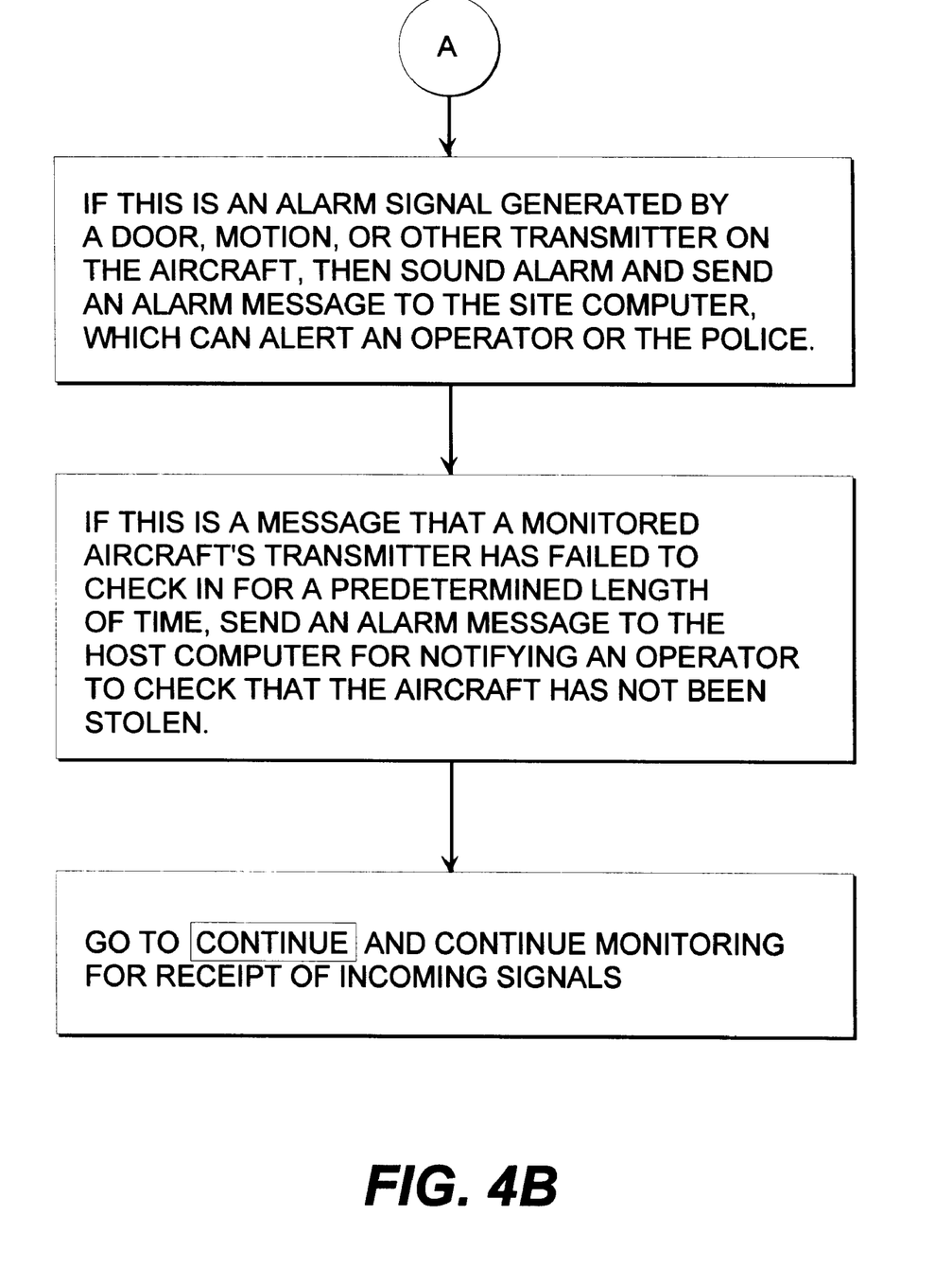

FIGS. 3 and 4 illustrate the fundamental modes of operation that comprise the method of the present invention for securing aircraft at an airport. FIG. 3 illustrates the functional flow of a check routine that preferably is carried out in the main computer 31 within the control panel 17. In fact, in the preferred embodiment, this is one primary function of the main computer 31; that is, to monitor each aircraft parked at the site continuously to insure that the transmitters associated with these aircraft check in at their regular scheduled times.

The algorithm of FIG. 3 begins by interrogating the customer database periodically to determine the time stamp of the last status transmission made by the transmitters aboard each of the monitored airplanes. This database interrogation can occur at regular time intervals within a broad range. However, it is desired that the interrogation occur at a time interval that is substantially shorter than the time interval of the status transmissions initiated by the transmitters aboard the airplanes. In the preferred embodiment, the transmitters aboard the airplanes transmit their status transmissions every ninety minutes and the check module interrogates the customer database every fifteen minutes. However, other time intervals for both the status transmissions and the customer database interrogation can be selected depending upon how quickly it is desired to know whether one of the transmitters has failed to check-in.

Once the check module interrogates the customer database and obtains the last check-in time for each aircraft, these times are compared to the current time to determine whether any of the transmitters aboard the monitored aircraft are overdue for a status transmission. If the difference between the current time and the last check-in time for a transmitter is greater than the time interval between status transmissions, then the aircraft is deemed to be overdue for a check-in. In this case, the overdue condition is reported to the action module, described in more detail below, for appropriate action.

If none of the aircraft are overdue for a status transmission, the check module checks the status of the digital input used to monitor the various alarm conditions aboard the aircraft to determine if any of the inputs have changed since the last database interrogation. If any of the digital inputs have changed, indicating a change in the status of the aircraft, then the changed digital inputs are reported to the action module for appropriate action. If none of the digital inputs have changed, indicating that all of the aircraft are secure, then the check module cycles back and continues by interrogating the customer database again at its next scheduled interrogation time.

Thus, the check module continuously monitors all of the aircraft at the site airport to determine first that each has "checked in" and that an alarm condition has not been indicated by a transmission received since the last customer database interrogation. As long as all of the aircraft continue to transmit their expected status transmissions and none of the digital inputs transmitted by the transmitters change, then all of the aircraft in the site security system are deemed secure and the check module continues its constant monitoring.

FIGS. 4A and 4B illustrate the action module, which preferably is programmed into the main computer 31 of the control panel and receives information from its mailbox. Information can be placed in the action module's mailbox from a variety of sources; however, the primary source of information delivered to the action module is the check module. More specifically, when the check module determines that the sensors aboard a particular aircraft have not checked in or that the digital inputs received from a sensor or from a user key transmitter 28 have changed, this information is placed in the action module's mailbox and made available to the action module.

The action module first receives an incoming coded signal transmitted from an aircraft transmitter or from the user key transmitter 28. Upon receipt of the coded signal, the action module extracts the unique identifier associated with the signal and searches the customer database to match the incoming signal to its transmitter and thus to the aircraft associated with the signal. If the ID transmitted with the signal is not associated with an aircraft in the database, this indicates that the signal has been generated from an aircraft that is not normally stowed at the site airport. This might occur, for example, when an aircraft is flown into a local airport from another airport within the security network. Although the aircraft will have an associated file in the customer database of its home base airport, it will not have a file in the customer database of the airport to which it was flown unless the pilot logs his aircraft onto the local security system when he arrives.

If it is determined that a received signal is not associated with an aircraft normally stowed at or temporarily logged in at the site airport, then a temporary file is created for the aircraft associated with the signal. Preferably, this temporary file is stored in the database of the site main computer 31 and is made available via telephone line 20 to the central facility computer 23, which monitors the various sites in the network. The central facility computer 23 preferably is programmed to poll each of the site main computers either periodically or upon command to determine whether any aircraft from one site airport in the network have been flown to another site airport in the network. This function can be used in many beneficial ways. For example, the movement of aircraft within the security network can be tracked by the central facility computer through the periodic polling of the various site main computers. When an aircraft arrives at a site other than its home site, the central facility computer will be informed of its arrival through the creation of the temporary file created by the site main computer when the sensors aboard the arriving aircraft transmit a coded signal to the site receiver. The central facility computer can then be instructed to consolidate this data in a variety of forms including tracking reports or the like.

Perhaps a more critical use for the periodic polling of the various sites within the network is the location of stolen aircraft. With the present invention, the occurrence of a theft can be detected quickly when the stolen airplane fails to checking at its home site. Appropriate authorities can then check with the owner of the aircraft and confirm that the aircraft has indeed been stolen. This information can then be conveyed to the central facility computer, which can be instructed to begin to poll all of the site main computers within the security network. When the stolen airplane lands at an airport within the network to refuel or for any other reason, the transmitter on board will check-in by transmitting its status transmission or will transmit alarm codes when the doors of the airplane are opened by the thief. A temporary file will then be created by the site main computer and this file will be retrieved by the central facility computer. Accordingly, the stolen aircraft will be located immediately upon landing at another airport within the security network and the appropriate authorities can be notified for remedial action. Obviously, this function of the system is enhanced as the number of individual airport sites within the country increases and the security network grows.

If a coded signal received by the action module is associated with an aircraft in the local site database, then the database is checked to determine the current status of this customer's security system. For example, the owner of the aircraft may previously have placed his system in a disarm or inactive mode in order to be able to use his aircraft. This would have been stored in the site database when the code was transmitted. If upon receipt of a subsequent transmission the status is determined to be inactive or disarmed, the incoming data is stored but no further action is taken. Thus, if an owner of an aircraft disarms his system and then opens the door of his aircraft, the signal transmitted when the door is opened will be stored but will not result in action because the security system for that aircraft has been placed in an inactivated state.

If a transmitted signal is received and the current status of the aircraft associated with the signal is active, the action module may initiate a number of actions depending upon the nature of the received signal. If the received signal was a key code transmission from an aircraft owner's personal key transmitter seeking to place his security system in an armed, disarmed, or test mode, the status bits of the most recently received signal from the airplane transmitter are checked to confirm that all the doors on the aircraft are closed. If so, the system sounds a tone on the local siren to acknowledge receipt of the request and that aircraft's security system is placed in the requested mode. If the most recently received sensor transmission from the aircraft indicates that one of its doors is open or that another alarm condition exists, the system status will not be changed as requested and an alarm signal will be sent to the central facility computer for appropriate action. Thus, a request to change the status of an aircraft's security system can only be made when all of the doors of the aircraft are shut and there are no other alarm conditions existing. If a door is open and a status request is transmitted from a key transmitter, the request is presumed to be an alarm condition and an alarm message is generated.

Upon successful transition from an armed to a disarmed mode, subsequent transmissions from the aircraft's transmitter will be stored but will not result in action. Upon a successful transition to a test mode, the user may test his security system, change the battery in his aircraft transmitter, or perform other system maintenance functions.

If the signal received by the action module is an alarm signal generated by a door, motion, or other sensor on the aircraft, then the action module generates a signal that causes the local alarm to sound and sends an alarm message to the central facility computer. The dispatcher can then take the appropriate action such as, for example, notifying the owner of the aircraft, or the police as the situation dictates. The detected condition is also stored in the site main computer's customer database and can be interrogated by the central facility computer if and when desired.

If a message is received from the check module indicating that a monitored aircraft within the system has failed to checking for a predetermined length of time, an alarm message to such effect is transmitted to the central facility computer. The dispatcher, then, notifies the appropriate personnel to verify whether or not the aircraft is still parked at the airport or whether it has indeed been stolen or moved out of range of the receiver. This condition might occur, for example, if a thief were simply to roll an aircraft out of range of the receiver before opening its door and flying it away. If such a condition occurs and a theft is verified, this information is made available to the central facility computer, which can then poll the various site main computers continuously to determine when the stolen aircraft lands at another airport site within the security network, whereupon the thief can be apprehended.

When the action module has performed the action appropriate to the content of the incoming coded signal, it returns to its monitoring mode and awaits receipt of the next incoming signal placed into its mailbox.

While a preferred mode of operation of the present invention has been described for securing aircraft, various other modes might well be implemented or additions and deletions made to the preferred mode to modify the applicability of the methodology. For example, the method of this invention could well be adapted to commercial airline baggage and passenger tracking rather than small aircraft security and tracking. In such a mode, a system of scanners and transponders could be installed at major airports to provide the ability to match a passenger actively with his or her baggage. Security transponders would be installed on each individual aircraft. A central security computer and terminal would be installed at the airport security command post. At the baggage check-in counter, personnel would issue standard bar coded tags, which would be attached to the customer's baggage. This data would automatically be uploaded to a central computer belonging to the airline. A port on the airline's computer would send the data concerning the passenger's baggage to the airport security computer. The customer would be issued a boarding pass with a similar bar code. A bar code scanner and security transponder would be located on the aircraft. As each passenger boarded the aircraft, the flight attendant would scan their boarding pass. The aircraft security transponder would send the information to the central security computer that the passenger has boarded the plane. Baggage placed in containers for shipping on the flight would be scanned in a similar fashion. The container in which the customer's baggage was placed would have incorporated in its transponder a locator device that would show its location on the airport within two meters.

After all passengers were aboard and the aircraft door closed, the aircraft security transponder would send a boarding complete signal to the security computer. This would signal a program in the computer to run a simple compare routine for each passenger and his or her baggage. If the compare program indicated that a passenger failed to board the aircraft, an alarm would be automatically generated showing the passenger's name, flight number, and quantity of checked baggage. It would also show the location of his or her baggage container. Security would then send a signal to the appropriate baggage handler to begin scanning the baggage in the specified container.

As the baggage was scanned, a light and tone would signal the baggage handler to remove each piece of luggage belonging to the identified passenger. After the baggage had been removed, then the aircraft would be loaded with all the boarded passenger's luggage. The removed baggage would be sent to security for examination.

Several hundred commercial flights could be handled simultaneously by the proposed system. Also it should be noted that the development cost and implementation for this system would be greatly reduced by making use of the existing airline baggage tracking systems that are already in use.

Another application of the basic methodology of the present invention is envisioned in the tracking of individuals such as small children provided with pager/transponders. In such a system, upon a command from a host computer, multiple site computers would poll and interrogate the unique identification number of a pager/transponder to determine whether it was in range of the site control panel. If the pager/transponder was in range, it would respond back to the nearest site control panel. A site control panel that had established communications with the pager/transponder would signal the host computer system of the connection.

Incorporated into the pager/transponder circuitry would be a GPS circuit providing latitude, longitude, direction, altitude, and average velocity information. The site control panel would pass this data to the host computer. Software in the host computer would then provide a map showing the location of the pager/transponder within two meters. Software would be available to parents or others tracking individuals such as a child with pager/transponders allowing them to log onto the host computer system and locate or send a page to their child.

In addition, a hidden switch on the pager/transponder would activate an emergency signal. The closest site control panel would relay this emergency signal to the host computer. An operator would see the location and name of the person sending the emergency signal. The operator would then contact and direct the local police to the location. Preferably, the local police would be provided a copy of the software and could be automatically notified and have the location sent directly to a specific patrol car. Information could also include a photograph and physical description of the person generating the alarm.

The invention has been described herein in terms of preferred embodiments and methodologies. It will be obvious to those of skill in the art, however, that various additions, deletions, and modifications might well be made to the disclosed embodiments without departing from the spirit and scope of the invention as set forth in the claims. For example, while the invention has been applied to aircraft within an airport security network in the preferred embodiment, the methodology of the invention is equally applicable to boats stowed at various marinas within a network or to cars parked at parking decks incorporated in a similar network. Accordingly, the scope of the invention, as recited in the claims hereof, should not be interpreted to be limited to the aircraft security system disclosed as the preferred embodiment. Other applications might be envisioned by those of skill in the art within the scope of he claims.

I claim:

1. In an airport network wherein a plurality of aircraft are stowed at each of a plurality of site airports, a method of securing the aircraft against vandalism and theft, said method comprising the steps of:

(a) detecting the occurrence of an unauthorized intrusion into or other alarm condition aboard one of the aircraft at a site airport;

(b) transmitting a uniquely identified coded signal from the aircraft in response to the detected condition;

(c) receiving the transmitted signal at the site airport where the transmission was made;

(d) comparing the unique identifier of the received signal to a list of identifiers for aircraft stowed at the site airport to determine if the transmission originated from an aircraft normally stowed at the site airport;

(e) if the transmission originated from an aircraft not normally stowed at the site airport, creating a record of the received coded signal in a site main computer and making the record available to a central facility computer coupled to each of the site main computers for tracking and location of an aircraft confirmed to have been stolen from another one of the site airports in the network;

(f) if the transmission originated from an aircraft normally stowed at the site airport, interpreting the coded signal to determine the nature of the condition aboard the aircraft; and (g) initiating remedial action appropriate to the nature of the condition indicated by the coded signal.

2. The method of claim 1 and wherein step (g) includes sounding an alarm located at the site airport.

3. The method of claim 2 and wherein step (g) includes notifying security personnel of the nature of the condition aboard the aircraft.

4. The method of claim 1 and further comprising the steps of periodically initiating a status transmission from the sensors aboard each of the aircraft, storing the time of each of the status transmissions in a data base, periodically interrogating the data base to determine the time of the last status transmission from each of the aircraft, comparing the time of last status transmission for each aircraft to a predetermined check-in time interval to determine if any of the aircraft are overdue for a status transmission, reporting any aircraft that are determined to be overdue for a status transmission, and initiating remedial action appropriate to the determined overdue check-in condition.

5. The method of claim 4 and wherein the remedial action appropriate to the overdue check-in condition includes confirming whether the aircraft associated with the overdue check-in condition has been taken from the site airport.

6. The method of claim 5 and wherein if the aircraft is confirmed to have been taken from the site airport, confirming that it has been stolen.

7. The method of claim 6 and wherein if the aircraft is confirmed to have been stolen, notifying the central facility computer of the identity of the stolen aircraft and causing the central facility computer to poll the site main computers coupled thereto to determine if the stolen aircraft lands at another site airport and its sensors transmit a signal stored in a temporary file in the site main computer at that airport, and notifying appropriate authorities of the location of the stolen airport for proper action.

8. The method of claim 1 and further comprising the steps of providing the owners of the aircraft with a key transmitter adapted to transmit coded signals indicative a request by an owner to arm or disarm his aircraft security system, receiving signals from key transmitters at the site airport, checking the status of the aircraft as indicated by the last transmission from a sensor aboard the aircraft to confirm that the aircraft is in a secure condition, and if the aircraft is determined to be in a secure condition, complying with the request indicated by the received key transmitter signal.

9. The method of claim 8 and wherein if the aircraft's security system is disarmed in response to a key transmission, receiving and storing subsequent signals from a sensor aboard the aircraft without further action.

10. A method of monitoring and securing a plurality of vessels stowed at a site storage location including vessels normally stowed at the site storage location and vessels temporarily located at the site storage location, each of the plurality of vessels being provided with at least one sensor adapted to transmit a uniquely identified coded signal at predetermined time intervals and wherein the site storage location is provided with a receiver adapted to receive the coded signals and computer means for storing the received signals and taking appropriate action in response thereto, said method comprising the steps of:

(a) maintaining in the computer means a data base that includes a file for each of the vessels normally stowed at the site storage location, each such file including the time of the last transmission received from a sensor aboard the vessel associated with the file;

(b) periodically interrogating the data base to determine the time of last received transmission for each of the vessels normally stowed at the site storage location;

(c) comparing the times of last received transmission to the current time to determine the time interval since last received transmission for each of the vessels normally stowed at the site storage location;

(d) comparing the determined time interval to a predetermined maximum time interval;

(e) identifying a vessel as overdue for check-in if the determined time interval for the vessel is greater than the predetermined maximum time interval;

(f) notifying security personnel of the overdue check-in condition for appropriate action;

(g) receiving coded signals from vessels temporarily located at the site storage location; and (h) creating a file in the computer means for each vessel temporarily located at the site storage location for monitoring the condition of such vessels while they are located at the site storage location.

11. The method of claim 10 and wherein the sensor aboard each vessel is further adapted to transmit a uniquely identified coded signal upon detection of an intrusion into the vessel, said method further comprising the steps of receiving a transmitted signal indicative of an intrusion, comparing the unique identifier of the transmitted signal with a data base of identifiers associated with vessels normally stowed at the site; if the unique identifier is not associated with a vessel normally stowed at the site, creating a record of the transmission and making it available to a central facility computer for appropriate action, if the unique identifier is associated with a vessel normally stowed at the site, assuming an alarm condition and initiating action appropriate to the alarm.

12. A method of tracking vessels that move from one site in a network of sites to another site in the network of sites, each of the vessels having a home site at which it is normally stowed, said method comprising the steps of:

(a) providing each vessel with a transmitter adapted to transmit a uniquely identified coded signal upon occurrence of a predetermined condition;

(b) providing each site with a receiver adapted to receive signals from vessel transmitters located at the site and a site computer coupled to the receiver for accessing the uniquely identified coded signals received by the receiver;

(c) providing a central computer means coupled to the site computers and adapted receive information therefrom;

(d) creating a data base in the site computer of each home site with the data base including the unique identifiers associated with each vessel normally stowed at the home site;

(e) receiving coded signals from the sensors of vessels at the sites;

(f) determining for each received signal whether it is associated with a vessel for which the receiving site is the home site;

(g) if the received signal is not associated with a vessel for which the receiving site is the home site, creating a record of the received signal and making the record available to the central computer means;

(h) at the central computer means, receiving records of non-home site transmissions from the site computers to track the movement of vessels between sites in the network.

13. The method of claim 12 and wherein step (f) comprises comparing the unique identifier of a received signal to the data base created in step (d).

14. The method of claim 13 and wherein step (h) further comprises polling the site computers when a non-home site transmission is received to determine the home site of the vessel associated with the transmission and the sites at which it had previously been detected as a non-home site vessel.

15. The method of claim 12 and wherein the vessels are aircraft and wherein the sites are airports.

16. The method of claim 12 and wherein the vessels are boats and wherein the sites are marinas.

17. The method of claim 12 and wherein the vessels are vehicles and wherein the sites are parking lots.

18. The method of claim 12 and wherein step (a), the predetermined condition is the lapse of a predetermined interval of time.

19. A security system for securing aircraft normally stowed at an airport and aircraft temporarily stowed at the airport, said security system comprising:

at least one sensor aboard each secured aircraft, said sensor being adapted to transmit a uniquely identified coded signal at predetermined time intervals;

a receiver at the airport for receiving signals transmitted by said sensors;

computer means coupled to said receiver for accessing the coded signals received by the receiver;

a data base stored in said computer means, said data base including a record for each aircraft normally stowed at the airport, each record including the time at which a transmission was last received from a sensor aboard the associated aircraft;

said computer means being programmed to interrogate said data base at predetermined intervals, to compare the time of last transmission stored in the data base for each aircraft normally stowed at the airport to the current time, and to determine the time interval since last transmission for each aircraft;

said computer means being further programmed to generate an alarm condition if a time interval is greater than a predetermined maximum time interval for an aircraft;

said computer means being further programmed to determine when a coded signal is received from an aircraft temporarily stowed at the airport and to create an associated record in said data base for monitoring the temporarily stowed aircraft while it is located at the airport.

20. A method of monitoring a plurality of vessels stowed at a site, the plurality of vessels including vessels for which the site is the home site and vessels for which the site is not the home site, the method comprising the steps of:

(a) providing each of the vessels with a transmitter adapted to transmit a uniquely coded signal upon the occurrence of a predetermined condition;

(b) providing a receiver at the site for receiving signals transmitted by the transmitters;

(c) providing a site computer coupled to the receiver for accessing the unique codes of signals received by the receiver;

(d) maintaining a data base in the site computer with the data base containing a record for each vessel for which the site is the home site;

(e) upon receipt of a signal, comparing the code of the signal to the data base to determine if the site is the home site of the vessel associated with the signal;

(f) if it is determined in step (e) that the site is the home site of a vessel associated with the signal, taking action appropriate to the predetermined condition;

(g) if it is determined in step (e) that the site is not the home site of the vessel associated with the signal, creating a record in the cite computer corresponding to the vessel for monitoring the vessel while it is stowed at the site and taking action appropriate to the predetermined condition.

21. The method of claim 20 and wherein a number of sites form a network of sites having corresponding receivers and site computers and further comprising the steps of providing a central facility computer linked to each of the site computers, periodically receiving data from the site computers, and determining based on the received data the status of vessels stowed at their home sites and the location of vessels stowed at sites other than their home sites for tracking the movement of vessels from site to site in the network of sites.

22. The method of claim 21 and wherein the vessels are aircraft and wherein the sites are airports.

23. The method of claim 21 and wherein the vessels are boats and wherein the sites are marinas.

* * * * *